(12) United States Patent
Sayama

(10) Patent No.: US 8,820,504 B2
(45) Date of Patent: Sep. 2, 2014

(54) HYDRAULIC SYSTEM

(75) Inventor: Masayuki Sayama, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 240 days.

(21) Appl. No.: 13/224,284

(22) Filed: Sep. 1, 2011

(65) Prior Publication Data

US 2012/0055753 A1    Mar. 8, 2012

(30) Foreign Application Priority Data

Sep. 3, 2010  (JP) ................. 2010-197995

(51) Int. Cl.
F16D 48/02 (2006.01)
F16D 25/12 (2006.01)
F16H 61/00 (2006.01)

(52) U.S. Cl.
CPC ............ F16D 48/02 (2013.01); *F16H 61/0021* (2013.01); *F16D 2048/0281* (2013.01)
USPC ....................................... 192/85.63

(58) Field of Classification Search
USPC ...................................... 192/85.63
See application file for complete search history.

(56) References Cited

U.S. PATENT DOCUMENTS

| | | | | |
|---|---|---|---|---|
| 6,789,658 | B2 * | 9/2004 | Busold et al. | 192/103 F |
| 2002/0173895 | A1 * | 11/2002 | Kitaori et al. | 701/51 |
| 2007/0080582 | A1 * | 4/2007 | Tanaka et al. | 303/115.4 |
| 2008/0190729 | A1 * | 8/2008 | Stehr et al. | 192/85 R |

FOREIGN PATENT DOCUMENTS

| | | |
|---|---|---|
| CN | 2290495 Y | 9/1998 |
| CN | 101357585 A | 2/2009 |
| EP | 2020521 A1 | 2/2009 |
| JP | H03-53670 U | 5/1991 |
| JP | 07-315059 A | 12/1995 |
| JP | 11-078588 A | 3/1999 |
| JP | 2001-003954 A | 1/2001 |
| JP | 2006-307927 A | 11/2006 |

OTHER PUBLICATIONS

The Notification of the First Office Action mailed Nov. 4, 2013, for Chinese Patent Application No. 2011102632657, with English translation, 15 pages.
Notice of Rejection Reasons mailed Feb. 4, 2014, for JP Application No. 2010-197995, with English translation, six pages.

* cited by examiner

*Primary Examiner* — Richard M. Lorence
(74) *Attorney, Agent, or Firm* — Bejin VanOphem and Bieneman PLC

(57) ABSTRACT

A hydraulic system is preferably used in combination with a motor and a clutch of a hybrid vehicle. The hydraulic system is comprised of a pump coupled with the motor to pressurize fluid; a pressurized fluid path coupled with the pump to conduct the pressurized fluid; an operating fluid path connecting the pressurized fluid path with the clutch to actuate the clutch; a depressurized fluid path to conduct depressurized fluid; and an on-off valve operated in cooperation with the clutch to selectively permit fluid connection of the pressurized fluid path to the depressurized fluid path so as to relieve pressure in the pressurized fluid path.

3 Claims, 3 Drawing Sheets

HYDRAULIC SYSTEM

CROSS-REFERENCE TO RELATED APPLICATIONS

This application is based upon and claims the benefit of priority from the prior Japanese Patent Application No. 2010-197995 (filed Sep. 3, 2010); the entire contents of which are incorporated herein by reference.

BACKGROUND OF THE INVENTION

1. Field of the Invention

The present invention relates to a hydraulic system preferably used for operating a clutch in a hybrid vehicle.

2. Description of the Related Art

A hybrid vehicle is comprised of an electric motor driven by a battery as well as a combustion engine for charging the battery. While the electric motor is steadily coupled with a main driveline to drive the vehicle, the engine is, in a typical construction, not steadily coupled with the main driveline. To selectively couple the engine with the main driveline, a hydraulically operable clutch and an oil pump for driving the clutch are in general provided. Japanese Patent Application Laid-open No. 07-315059 discloses a related art.

SUMMARY OF THE INVENTION

In the prior art, a hydraulic system is in general so structured that an oil pump steadily pressurizes oil in its oil circuit even when the system is not required to exert hydraulic force to the clutch. As a motor and/or an engine must bear resistance by the pressurized oil, this causes non-negligible energy loss. The present invention has been achieved in view of the above problem.

According to an aspect of the present invention, a hydraulic system is used in combination with a motor and a clutch. The hydraulic system is comprised of a pump coupled with the motor to pressurize fluid; a pressurized fluid path coupled with the pump to conduct the pressurized fluid; an operating fluid path connecting the pressurized fluid path with the clutch to actuate the clutch; a depressurized fluid path to conduct depressurized fluid; and an on-off valve operated in cooperation with the clutch to selectively permit fluid connection of the pressurized fluid path to the depressurized fluid path so as to relieve pressure in the pressurized fluid path.

DETAILED DESCRIPTION OF THE PREFERRED EMBODIMENT

Certain embodiments of the present invention will be described hereinafter with reference to the appended drawings.

Figure 1:
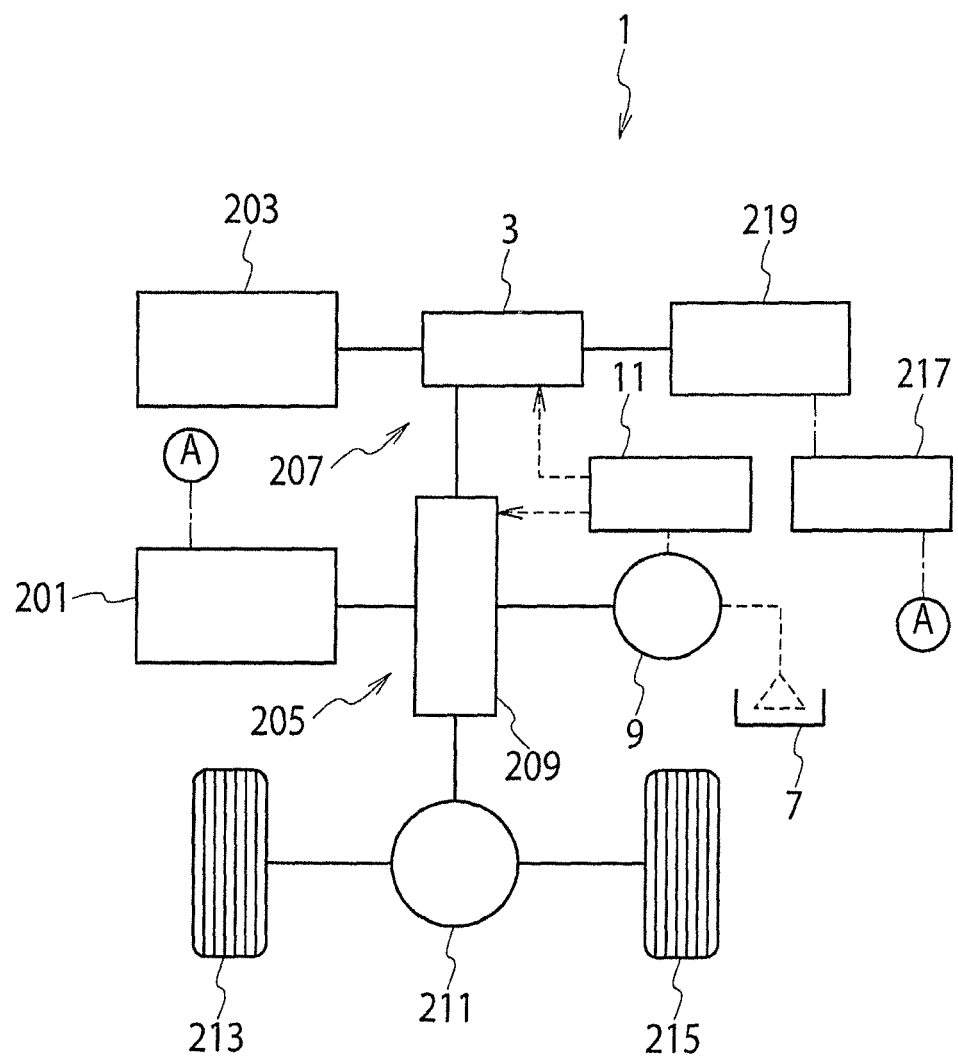
FIG. 1 is a block diagram of a vehicle to which a hydraulic system is applied.

Referring to FIG. 1, a hydraulic system 1 is applied to a vehicle generally comprised of a main driving system 205 constituted of an electric motor/generator 201 and a transmission 209, a sub-driving system 207 constituted of a motor such as a combustion engine 203 and a generator 219 coupled therewith, a differential 211, and left and right wheels 213, 215. The generator 219 is electrically connected with a battery 217 to charge the battery 217, which is in turn electrically connected with the electric motor/generator 201 to drive the main driving system 205.

While the main driving system 205 is steadily coupled with the differential 211 to drive the left and right wheels 213, 215, the sub-driving system 203 is not. A clutch 3 controllably establishes connection of the sub-driving system 203 to the main driving system 205. The hydraulic system 1 is used for operating the clutch 3. The hydraulic system 1 may be alternatively or additionally used for operating any other element.

The hydraulic system 1 is comprised of a strainer 7, a pump 9, and a hydraulic circuit 11 coupled with the clutch 3. The hydraulic circuit 11 may be further coupled with the transmission 209. The pump 9 is drivingly coupled with the transmission 209 to receive torque from motors of electric motor/generator 201 and/or the engine 203, thereby pressurizing and transferring fluid in the strainer 7 to the hydraulic circuit 11. Proper hydraulic fluid such as mineral oil is filled within the hydraulic circuit 11 so as to hydraulically actuate the clutch 3.

Figure 2:
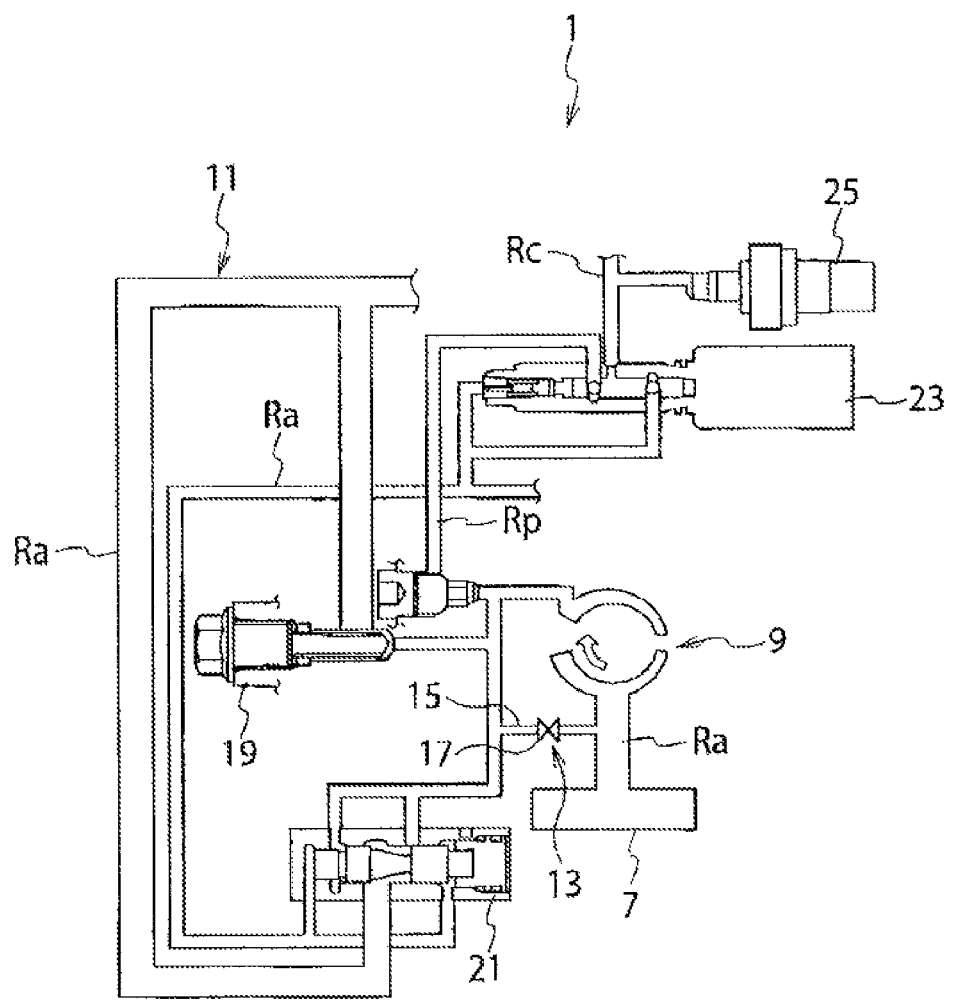
FIG. 2 is a schematic view of a hydraulic system in accordance with a first embodiment of the present invention.

Referring to FIG. 2, the hydraulic circuit 11 is in general constituted of a pressurized fluid path Rp coupled with the pump 9 to conduct the pressurized fluid, an operating fluid path Rc connecting the pressurized fluid path Rp with the clutch 3, and a depressurized fluid path Ra to conduct depressurized fluid. In order to selectively permit fluid connection of the pressurized fluid path Rp to the depressurized fluid path Ra, a depressurizing means 13 is provided.

While within the pressurized fluid path Rp the fluid is pressurized, within the depressurized fluid path Ra the fluid is in a depressurized state, typically at the atmospheric pressure. The strainer 7 is a part of the depressurized fluid path Ra.

In between the pressurized fluid path Rp and the operating fluid path Rc provided is a solenoid valve 23. Any actuation means may be used instead of the solenoid. By operating the solenoid or the actuation means in the valve 23, one can actively control fluid connection therebetween. The operating fluid path Rc, when in fluid connection with the pressurized fluid path Rp, exerts hydraulic force on the clutch 3, thereby switching engagement-disengagement of the clutch 3. A drain of the solenoid valve 23 is in fluid connection with the depressurized fluid path Ra to circulate the fluid within the hydraulic circuit 11.

On the operating fluid path Rc preferably provided is a pressure sensor 25, which may be used for verification of normal operation or feedback control for pressure regulation.

The hydraulic circuit 11 is further comprised of a pressure regulator 21 in fluid connection with the pressurized fluid path Rp for the purpose of regulating pressure therein at a constant value. Any general construction such as a poppet valve controllably pressurized by a spring or such can be applied to the pressure regulator 21. A drain of the pressure regulator 21 is in fluid connection with the depressurized fluid path Ra to circulate the exhausted fluid within the hydraulic circuit 11.

The hydraulic circuit 11 may be comprised of a relief valve 19 to relieve excessive pressure in the pressurized fluid path Rp. A drain of the relief valve 19 is also in fluid connection with the depressurized fluid path Ra.

The depressurizing means 13 is comprised of a communication path 15 and an on-off valve 17. The communication path 15 connects any location in the pressurized fluid path Rp with any location in the depressurized fluid path Ra, thereby allowing pressure relief when the valve 17 is opened.

The location where the communication path 15 is connected with the depressurized fluid path Ra is the strainer 7 in the embodiment shown in FIG. 2. This embodiment is advantageous in simplification of the system as the fluid in the pressurized fluid path Rp readily returns to the strainer 7 without any additional means such as a one-way valve. Various locations may be nevertheless possible, of course. Similar applies to the location where the communication path 15 is connected with the pressurized fluid path Rp.

To the on-off valve 17, a normally opened valve may be applied, but a normally closed valve may be alternatively applied. The on-off valve 17 may include a solenoid for actuation of itself but any other actuation means may be used.

The on-off valve 17 is operated in cooperation with the clutch 3. This cooperation may be enabled in various ways. In one embodiment, the solenoid for actuating the valve 17 is operated by an electronic switch interlocked with an electronic switch for operation of the clutch 3 for example. Alternatively, any mechanical link may be established between the clutch 3 and the valve 17 to enable cooperation.

When the vehicle is operated to engage the clutch 3, the pump 9 driven by the main driving system 205 keeps supplying pressure to the pressurized fluid path Rp, which is in turn used to keep the clutch 3 in the engaging state. When the vehicle is operated to disengage the clutch 3, the on-off valve 17 is in response opened to relieve the pressure in the pressurized fluid path Rp. Thus the main driving system 205 is freed from the load by the hydraulic pressure. This leads to energy-saving operation of the hydraulic system, although its construction is so simple.

Figure 3:
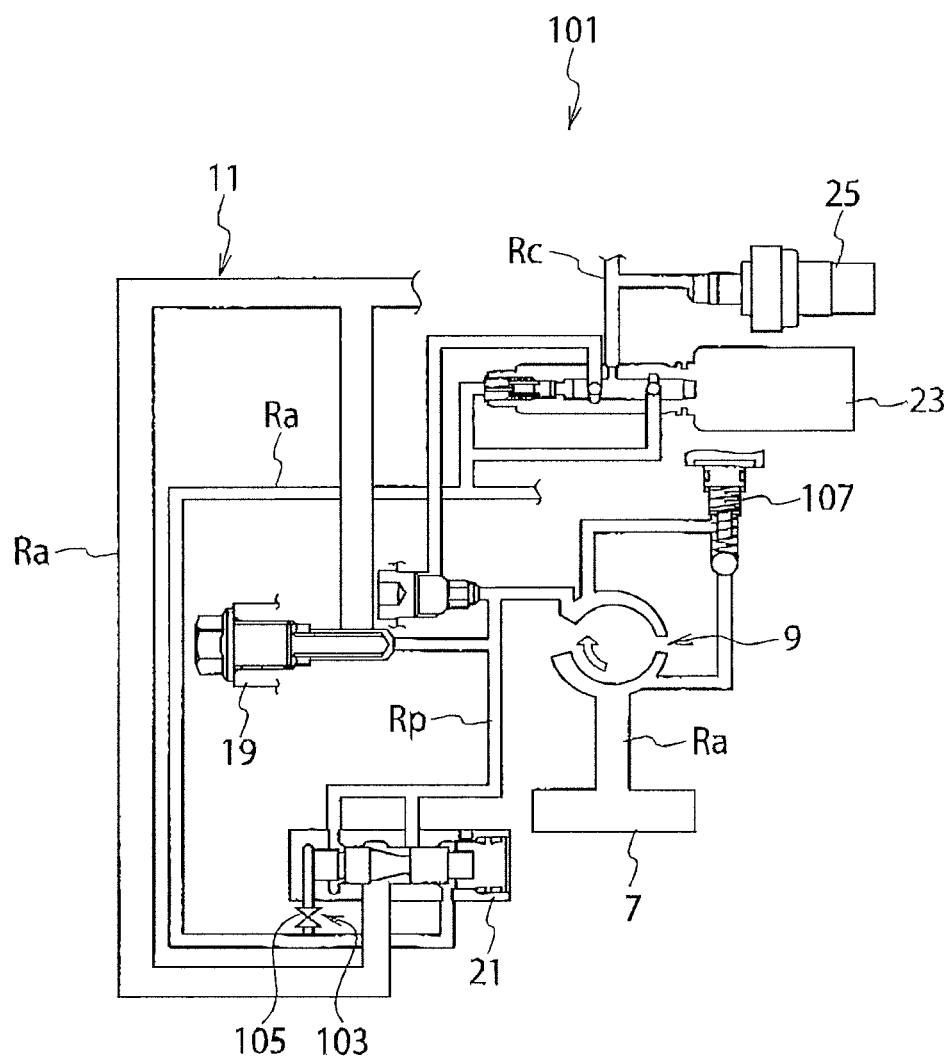
FIG. 3 is a schematic view of a hydraulic system in accordance with a second embodiment of the present invention.

FIG. 3 shows one of variations of the aforementioned embodiment. In a hydraulic system 101 of the present embodiment, a depressurizing means 103 is located in between the drain of the pressure regulator 21 and the depressurized fluid path Ra. An on-off valve 105 of the depressurizing means 103, operated in cooperation with the clutch 3, allows pressure relief in the pressure regulator 21 when opened. To the on-off valve 105, a normally closed valve is preferably applied, as impressed pressure is relatively low. Of course, a normally opened valve may be instead applied to the on-off valve 105.

A one-way valve 107 may be provided so as to connect the downstream side of the pump 9 to the upstream side. When the downstream side is sufficiently pressurized, the one-way valve 107 cuts off fluid communication between the downstream side and the upstream side. When the pressure difference therebetween is relatively small, the downstream side becomes in fluid communication with the upstream side.

As with the aforementioned embodiment, the hydraulic system 101 relieves pressure in the pressurized fluid path Rp when the clutch 3 is disengaged, thereby easing the load on the main driving system 205 and saving energy loss.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A hydraulic system used in combination with a motor and a clutch, comprising:
   a pump coupled with the motor to pressurize fluid;
   a pressurized fluid path coupled with the pump to conduct the pressurized fluid;
   an operating fluid path connecting the pressurized fluid path with the clutch to actuate the clutch;
   a depressurized fluid path to conduct depressurized fluid;
   an on-off valve operated in cooperation with the clutch to selectively permit fluid connection of the pressurized fluid path to the depressurized fluid path so as to relieve pressure in the pressurized fluid path; and
   a pressure regulator configured to regulate the pressure in the pressurized fluid path at a constant value, the pressure regulator including a drain in fluid connection with the on-off valve.

2. The hydraulic system of claim 1, further comprising:
   a strainer serving as a source of the fluid for the pump and in fluid connection with the on-off valve.

3. The hydraulic system of claim 1, further comprising:
   a valve configured to selectively permit fluid connection between the pressurized fluid path and the operating fluid path, whereby enabling actuation of the clutch.

* * * * *